July 22, 1941. N. E. LINDENBLAD 2,250,308
SYSTEM FOR FEEDING A SINGLE UTILIZATION CIRCUIT
WITH ENERGY AT TWO FREQUENCIES
Filed Aug. 12, 1939 2 Sheets-Sheet 1
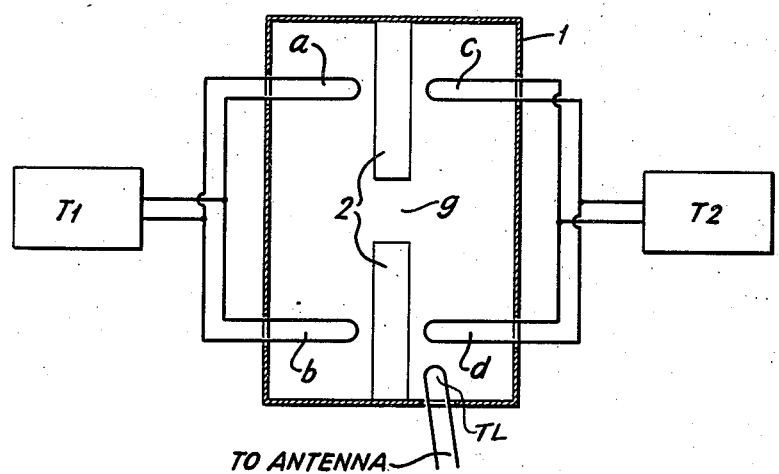
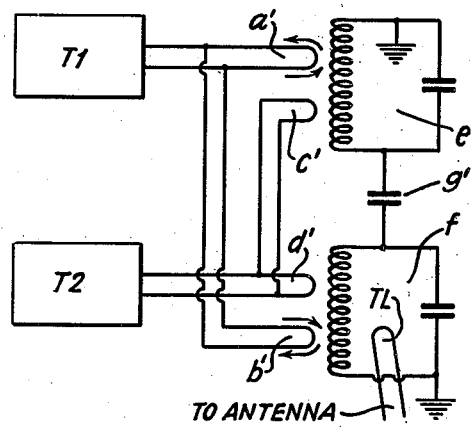
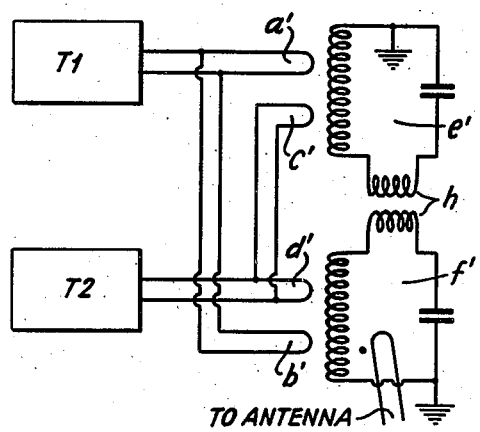
INVENTOR.
NILS E. LINDENBLAD
BY
ATTORNEY.

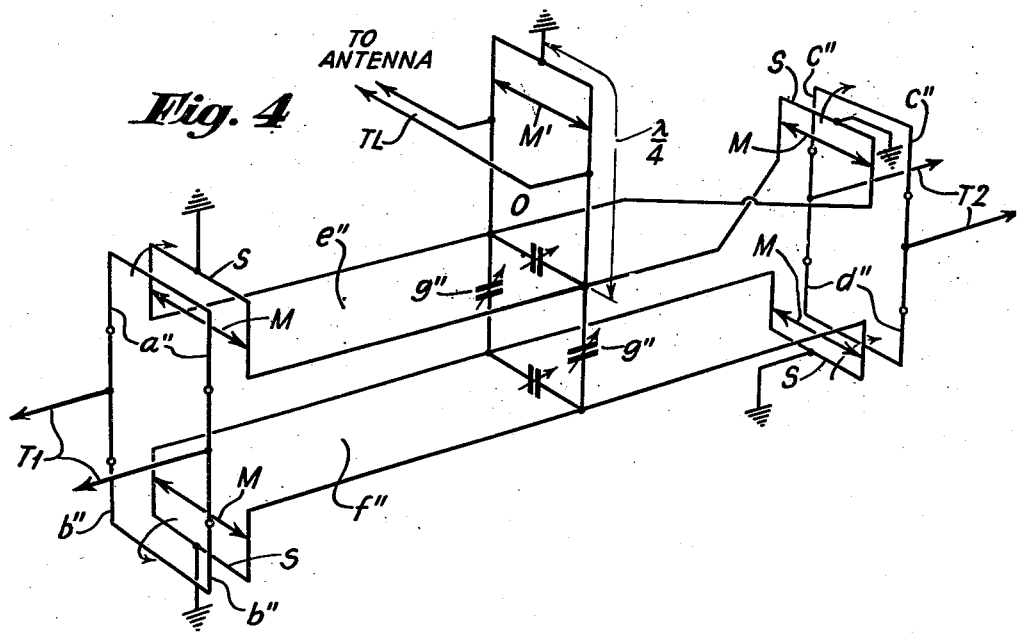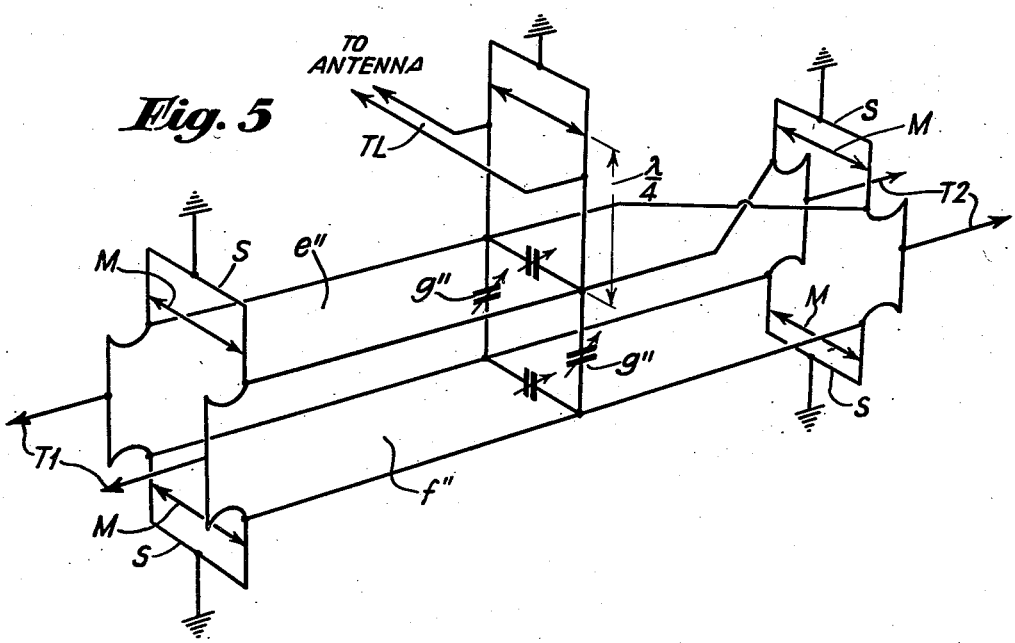

Patented July 22, 1941

2,250,308

UNITED STATES PATENT OFFICE 2,250,308

SYSTEM FOR FEEDING A SINGLE UTILIZATION CIRCUIT WITH ENERGY AT TWO FREQUENCIES

Nils E. Lindenblad, Port Jefferson, N. Y., assignor to Radio Corporation of America, a corporation of Delaware Application August 12, 1939, Serial No. 289,780

16 Claims. (Cl. 178—44)

This invention relates broadly to electrical transmission systems, and particularly to a system for feeding a load, such as an antenna system, with energy from two transmitters operating simultaneously at different frequencies.

One of the objects of the present invention is to enable two transmitters of different frequencies to feed the same load system simultaneously in such manner that there is no reaction between the transmitters.

In accordance with one feature of the invention, there are employed two tuned circuits, electrically and mechanically identical, substantially, coupled to each other to provide two degrees of freedom. The two transmitters are each arranged to feed both tuned circuits and are so coupled that a neutralizing balance is obtained between the transmitters, although both tuned circuits deliver power to a load circuit at the frequency of each transmitter, the frequencies of which correspond to the two degrees of freedom of the two combined circuits.

Other objects and features will appear from a reading of the following description in conjunction with drawings illustrating different embodiments of the invention, given by way of example only. In the drawings:

Fig. 1 illustrates the principles of the invention as applied to a system employing a concentric line type of tuned circuit;

Figs. 2 and 3 illustrate the invention as applied to systems employing lumped tuned circuits; and Figs. 4 and 5 illustrate embodiments employing Lecher wire tuned circuits.

Referring to Fig. 1, there is shown a concentric line resonator having an outer conductor 1 and a pair of coaxial inner conductors 2, 2, of equal lengths, the latter being capacitively coupled together at their adjacent ends at the location labeled $g$. A pair of transmitters T1 and T2 operating at different frequencies are each coupled by branch circuits $a$, $b$ and $c$, $d$, respectively, to both central rods. The concentric line tuned circuit 1, 2 is similar to that shown in Fig. 2 of Thompson Patent No. 2,104,915, granted January 11, 1938, to which reference is made for a more detailed description of this general type of resonator. The two equal length rods 2, 2, may be made to fluctuate in potential oppositely with respect to each other, or both rods may be made to fluctuate cophasally. Since mutual capacity $g$ enters in differently for these two modes of oscillation, this principle is utilized to obtain two degrees of freedom, i. e., two resonance points for the same tuned circuit. Transmitter T1 excites both rods cophasally through equal length and electrically parallel branches $a$ and $b$, at one particular frequency, while transmitter T2 excites both rods 2, 2 out of phase (i. e., in phase opposition) through equal length and reversely connected branches $c$ and $d$, at another particular frequency. When the coupling reactance $g$ is a capacity, the cophasal excitation will take place at the higher of the two frequencies. Both frequencies may be separated over any desired range depending upon the mutual reactance between the adjacent ends of the two coaxial rods 2. This reactance, if capacitive, between the rods may be increased or decreased by moving the rods or by attaching plates to their adjacent ends, thus varying the frequency range in which the two resonance points fall.

The output circuit TL is shown inductively coupled to one of the rods 2 to obtain both frequencies, although, if desired, the coupling between TL and the rod 2 may be direct or capacitive. Due to the coupling reactance, however, both circuit sections transfer energy to the output circuit TL.

Due to the fact that branches $a$ and $b$ supply cophasal excitation, while branches $c$ and $d$ supply excitation of opposite phases to the rods 2, 2, there can be no transfer of energy from one transmitter to the other transmitter. Specifically, where branch $c$ tends to induce in branch $a$ a positive potential, the branch $d$ will tend to introduce in $b$ an equal and opposite negative potential, thus causing cancellation at the junction points to the transmitter T1. Similarly, any energy introduced by branch $a$ into branch $c$ will be cancelled by the energy introduced by branch $b$ into branch $d$, at the junction points to transmitter T2.

In effect, the concentric line resonator of Fig. 1 is equivalent to two concentric line resonators having a mutual coupling reactance.

Fig. 2 shows a similar arrangement to Fig. 1, except that the concentric line resonator has been replaced by two lumped identical parallel tuned circuits $e$ and $f$ which are capacitively coupled together by capacitor $g'$. The two circuits $e$ and $f$ are identical in construction, and hence are tuned to the same frequency when considered separately. Here again transmitter T1 introduces cophasal excitation to both tuned circuits at one particular frequency through branches $a'$ and $b'$. In practice, branches $a'$ and $b'$ are of equal length. It should be noted from the directions of the currents shown in the branches that potentials of the same phase are applied by branches a' and b' to opposite armatures of the capacity g'. Transmitter T2, however, applies excitation of opposite phase to tuned circuits e and f through equal length branches c' and d' at another frequency, producing opposite potentials on the armatures of the capacitor g'. Here again, one transmitter cannot react on the other transmitter. Output is derived from one of the tuned circuits e or f by transmission line TL.

Fig. 3 is a modification of Fig. 2, employing inductive coupling reactance between the two tuned circuits instead of capacitive coupling reactance employed in Figs. 1 and 2. Except for this difference, the principles described before in connection with Figs. 1 and 2 apply equally well to Fig. 3. The tuned circuits are identified in Fig. 3 as e' and f' and are shown coupled together by inductive reactances h having a mutual magnetic field.

Although Figs. 1 and 2 and 3 show the branches a' and b', and also c' and d' in electrically parallel relation, it should be understood that these respective branches may be in series relation, provided proper lengths of connections are employed so that the desired phase relations are not disturbed.

Fig. 4 constitutes one form of practical construction of the principles of the invention applied to tuned circuits in the form of Lecher wire systems. The same reference characters except for a difference in the prime designations have been applied to Fig. 4 as have been applied to Figs. 1, 2 and 3, in order to show the electrically equivalent elements. The total length of each Lecher wire system e'' and f'' is electrically one-half wavelength including the centrally located tuning condenser at the voltage maximum point, and including the variable shorting bars M, M at both ends of each tuned circuit. The tuned circuits e'' and f'' are capacitively coupled together by two capacitors g'', g'' which connect with the maximum voltage points of the Lecher systems e'' and f''. The ends of the Lecher system are shorted permanently by cross wires S, S which in turn may be grounded at their centers, as shown. These ground or zero radio frequency points are in effect voltage minimum points. The ends of the Lecher systems are turned at right angles to the longest dimension in order to facilitate coupling to the branches a'', b'', c'' and d''. It should be noted that the Lecher system e'' is transposed at one end to establish the desired phase relations, although if desired this end of the Lecher system need not be transposed and thus conform with the rest of the tuned circuit, in which case the branch c'' should be reversed with respect to d''.

The output circuit O for Fig. 4, in this case also a Lecher system, is connected to one of the tuned circuits, in this case e''. This output circuit is electrically one-quarter of the mean wavelength for the two frequencies, as measured from the ground or electrical center of O to the points of connection to the circuit e'', as shown. An adjustable shorting bar M' serves to tune the output circuit to the mean wavelength. The output circuit O is loaded by a transmission line TL associated with an antenna or other suitable utilization circuit. In effect, output circuit O is an impedance transforming device between circuit e'' and the load TL. Line TL, depending upon its impedance, may be directly connected to the circuit e'' at the armatures of the tuning capacitor.

Fig. 5 is similar to Fig. 4, except that the two transmitters T1 and T2 are directly connected to the Lecher wire systems e'' and f'', instead of inductively as shown in Fig. 4. It should be observed that branches a'', b'', c'' and d'' are omitted from this figure. The principles of operation are generally the same for both of these figures.

What is claimed is:

1. In combination, a high frequency load adapted for operation on two different frequencies, a first source of oscillations of one frequency, a second source of oscillations of another frequency, a pair of substantially similar tuned circuits mutually coupled together by a reactance, said first and second sources being coupled to both of said tuned circuits such that one source excites both tuned circuits cophasally while the other source excites both tuned circuits in phase opposition, said load being coupled to one of said tuned circuits, the frequencies of said two sources of oscillation corresponding to the two degrees of resonance freedom of the system.

2. In combination, a high frequency load adapted for operation on two different frequencies, a first source of oscillations of one frequency, a second source of oscillations of another frequency, a pair of parallel tuned circuits tuned to substantially the same frequency and capacitively coupled together, said first and second sources being coupled to both of said tuned circuits such that one source excites both tuned circuits cophasally while the other source excites both tuned circuits in phase opposition, said load being coupled to one of said tuned circuits.

3. In combination, a high frequency load adapted for operation on two different frequencies, a first source of oscillations of one frequency, a second source of oscillations of another frequency, a pair of similar parallel tuned circuits tuned to substantially the same frequency and inductively coupled together, said first and second sources being coupled to both of said tuned circuits such that one source excites both tuned circuits cophasally while the other source excites both tuned circuits in phase opposition, said load being coupled to one of said tuned circuits.

4. In combination, a high frequency load adapted for operation on two different frequencies, a first source of oscillations of one frequency, a second source of oscillations of another frequency, a pair of tuned similar circuits tuned to substantially the same frequency, each tuned circuit comprising an inductance in parallel with a capacitor, a capacitive connection between one terminal of one tuned circuit and one terminal of the other tuned circuit, connections from the other terminals of said tuned circuits to a point of zero radio frequency potential, said first and second sources being inductively coupled to the inductances of both tuned circuits, such that one source excites both tuned circuits cophasally while the other source excites both tuned circuits in phase opposition, said load being coupled to one of said tuned circuits.

5. In combination, a high frequency load adapted for operation on two different frequencies, a first source of oscillations of one frequency, a second source of oscillations of another frequency, a pair of tuned similar circuits tuned to substantially the same frequency, each tuned circuit comprising a pair of inductance coils in series connected in parallel to a capacitor, one inductance coil of one tuned circuit being inductively coupled to the corresponding coil of the other tuned circuit, said first and second sources being inductively coupled to the remaining inductance coils of both tuned circuits, such that one source excites both tuned circuits cophasally while the other source excites both tuned circuits in phase opposition, said load being coupled to one of said tuned circuits.

6. Apparatus in accordance with claim 1, characterized in this that said tuned circuits comprise Lecher wire systems.

7. In combination, a high frequency load adapted for operation on two different frequencies, a first source of oscillations of one frequency, a second source of oscillations of another frequency, a pair of tuned circuits each in the form of parallel conductor systems, said tuned circuits being tuned to substantially the same frequency and mutually coupled together, said first and second sources being inductively coupled to both of said tuned circuits such that one source excites both tuned circuits cophasally while the other source excites both tuned circuits in phase opposition, said load being coupled to one of said tuned circuits.

8. In combination, a high frequency load adapted for operation on two different frequencies, a first source of oscillations of one frequency, a second source of oscillations of another frequency, a pair of tuned circuits each in the form of parallel conductor systems, said tuned circuits being tuned to substantially the same frequency and mutually coupled together, said first and second sources being directly connected to both of said tuned circuits such that one source excites both tuned circuits cophasally while the other source excites both tuned circuits in phase opposition, said load being coupled to one of said tuned circuits.

9. In combination, first and second sources of high frequency oscillations of different frequencies, a pair of tuned circuits each in the form of a pair of parallel conductors directly connected together at their ends and tunable by means of a capacitor across the conductors at their centers, said parallel conductors being one-half wavelength long, said circuits being tuned to substantially the same frequency, means for capacitively coupling together the conductors of one tuned circuit with the corresponding conductors of the other tuned circuit at points of maximum voltage on said conductors, connections from points of minimum voltage at the ends of said tuned circuits to points of zero radio frequency potential, an output circuit comprising a pair of parallel conductors substantially one-quarter of the wavelength for the mean frequency of said first and second sources connected across the conductors of one of said tuned circuits at points of substantially maximum voltage thereon, said first and second sources being coupled to the ends of both of said tuned circuits such that one source excites both tuned circuits cophasally while the other source excites both tuned circuits in phase opposition.

10. In combination, a high frequency load adapted for operation on two different frequencies, a first source of oscillations of one frequency, a second source of oscillations of another frequency, a concentric resonant line system comprising an outer conductor and an inner conductor, said inner conductor comprising two substantially equal length spaced rods located in the same straight line, capacitively coupled together at their adjacent ends and coupled to the outer conductor at their other ends, said first and second sources being coupled to both of said rods such that one source excites both rods cophasally while the other source excites both rods in phase opposition, said load being coupled to one of said rods.

11. In combination, a high frequency load adapted for operation on two different frequencies, a first source of oscillations of one frequency, a second source of oscillations of another frequency, a concentric resonant line system comprising an outer conductor and an inner conductor, said inner conductor comprising two equal length spaced rods located in the same straight line, capacitively coupled together at their adjacent ends and coupled to the outer conductor at their other ends, said first and second sources being inductively coupled to both of said rods through equal length branch circuits such that one source excites both rods cophasally while the other source excites both rods in phase opposition, said load being coupled to one of said rods.

12. In combination, a high frequency load adapted for operation on two different frequencies, a first source of oscillations of one frequency, a second source of oscillations of another frequency, a pair of identical concentric line resonators tuned to one frequency and having a mutual coupling reactance, said first and second sources being coupled to both resonators through electrically equal length branches, such that one source excites both resonators cophasally while the other source excites both resonators in phase opposition, said load being coupled to one of said resonators.

13. In combination, a high frequency load adapted for operation on two different frequencies, a first source of oscillations of one frequency, a second source of oscillations of another frequency, a pair of substantially similar tuned circuits mutually coupled together, said first and second sources being coupled to both of said tuned circuits such that one source excites both tuned circuits cophasally while the other source excites both tuned circuits in phase opposition, said load being coupled to one of said tuned circuits, the frequencies of said two sources of oscillation corresponding to the two degrees of resonance freedom of the system, whereby both sources of oscillations deliver power to said load and a neutralizing balance is obtained between both sources of oscillations.

14. In combination, a high frequency load adapted for operation on two different frequencies, a first source of oscillations of one frequency, a second source of oscillations of another frequency, a pair of substantially similar tuned circuits mutually coupled together, said first and second sources each being coupled by equal length branch circuits to both of said tuned circuits such that one source excites both tuned circuits cophasally while the other source excites both tuned circuits in phase opposition, said load being coupled to one of said tuned circuits, the frequencies of said two sources of oscillation corresponding to the two degrees of resonance freedom of the system, whereby both sources of oscillations deliver power to said load without undesirable interaction between said sources.

15. In combination, a high frequency circuit adapted for operation on two different carrier frequencies, a first translating means adapted for operation at one frequency, a second translating means adapted for operation at another frequency, a pair of substantially similar tuned circuits mutually coupled together reactively, said first and second translating means being coupled to both of said tuned circuits such that one of said translating means is coupled to both tuned circuits cophasally while the other translating means is coupled to both tuned circuits in phase opposition, said high frequency circuit being coupled to one of said tuned circuits, the frequencies of operation of said two translating means corresponding to the two degrees of resonance freedom of the system.

16. In combination, an antenna circuit adapted for operation on two different carrier frequencies, a first translating means adapted for operation at one frequency, a second translating means adapted for operation at another frequency, a pair of substantially similar tuned circuits mutually coupled together reactively, said first and second translating means being coupled to both of said tuned circuits such that one of said translating means is coupled to both tuned circuits cophasally while the other translating means is coupled to both tuned circuits in phase opposition, said antenna circuit being coupled to one of said tuned circuits, the frequencies of operation of said two translating means corresponding to the two degrees of resonance freedom of the system.

NILS E. LINDENBLAD.